United States Patent [19]

Martin et al.

[11] 3,801,465

[45] Apr. 2, 1974

[54] ERYTHROMYCIN E

[75] Inventors: Jerry Roy Martin, Waukegan; Alma W. Goldstein, Lake Bluff, both of Ill.

[73] Assignee: Abbott Laboratories, North Chicago, Ill.

[22] Filed: Jan. 22, 1973

[21] Appl. No.: 325,695

Related U.S. Application Data

[62] Division of Ser. No. 107,428, Jan. 18, 1971, Pat. No. 3,714,142.

[52] U.S. Cl................................................ 195/80 R
[51] Int. Cl................................................ C12d 9/00
[58] Field of Search.................................. 195/80 R

[56] References Cited
UNITED STATES PATENTS
3,714,172   1/1973   Martin et al................. 195/80 R X Primary Examiner—A. Louis Monacell
Assistant Examiner—Robert J. Warden
Attorney, Agent, or Firm—Robert L. Niblack; James L. Bailey

[57] ABSTRACT

Erythromycin E is useful as an antibiotic. The compound is prepared by the fermentation of erythromycin with *Streptomyces erythreus* NRRL 3887 in suitable nutrient media.

1 Claim, No Drawings

ERYTHROMYCIN E

This is a division, of application Ser. No. 107,428 now U.S. Pat. No. 3,714,142 filed Jan. 18, 1971.

This invention relates to a novel derivative of erythromycin which is useful as an antibiotic. More particularly, this invention relates to the novel compound erythromycin E and to a process for preparing this derivative by fermentation means using a strain of *Streptomyces erythreus*.

The compound of this invention has the following structural formula:

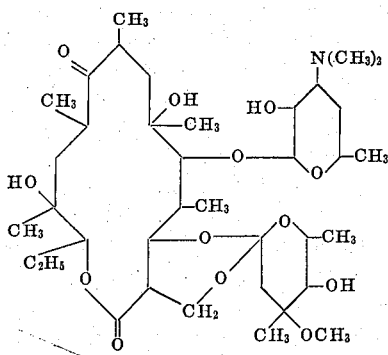

This compound is prepared by the fermentation of erythromycin in a nutrient media comprising a carbohydrate energy source such as a monosaccharide, e.g., glucose and corn starch; and a source of nitrogen such as soy flour, corn steep liquor, ammonium nitrate and the like, which media has been seeded with a culture of *Streptomyces erythreus* NRRL 3887. It is preferred that the nutrient media comprise a buffering agent to moderate the pH as the fermentation progresses. Such buffering agents which are suitable include dihydrogen phosphate and alkaline earth carbonates, e.g., calcium carbonate. The foregoing description of the compound of this invention will now further be illustrated by a specific example setting forth the best mode of preparing the compound.

Seed cultures of *Streptomyces erythreus* NRRL 3887 were prepared in a medium consisting of (in grams per liter) glucose monohydrate (Cerelose), 15.0; soybean meal, 15.0; and $CaCO_3$, 1.0. The cultures were incubated at 32° C. for 72 hours on a rotary shaker. The seed was added at a level of 3–5% (v/v) into 500 ml. Erlenmyer flasks containing 50 ml. of a fermentation medium consisting of the following components in grams:

| | |
|---|---|
| Corn starch | 15.0 |
| Soybean meal | 20.0 |
| Corn steep | 50.0 |
| $CaCO_3$ | 1.0 |
| Soybean oil (Edsoy) | 50.0 |
| Tap water | 1000 |

The medium was adjusted to pH 6.8 with sodium carbonate prior to sterilization. The fermentation flasks were incubated at 32° C. in a rotary shaker (250 rpm) for 48 hours, then 25 mg. of the finely divided erythromycin A was added to each of 40 flasks. Incubation with shaking was continued for an additional 120 hours, then the flask contents were pooled and clarified as follows. To the fermentation contents was added, with stirring, an equal volume of an aqueous solution of 10% zinc sulfate followed by a volume of 0.5 N sodium hydroxide sufficient to raise the of the solution to 8.5. A filter aid, Dicalite, was added and the mixture was stirred for 5 minutes. The mixture was filtered and the clear filtrate was collected. The filtrate was extracted twice with ½ volume of ethyl acetate. The combined ethyl acetate extract was washed two times with water and dried over anhydrous $MgSO_4$. Concentration in vacuo gave 1.112 g. of dark viscous oil. The oil was added to the top of a column of Sephadex I.H-20 (2.2 × 90 cm) prepared and eluted with methanol. Eluded fractions monitored by thin layer chromatography, showed three major components only partially separated from one another. Thin layer chromatographic comparison indicated that two of the components were known compounds: unchanged added erythromycin A and anhydroerythromycin A. Fractions enriched in the third component were pooled and concentrated to dryness to give 448 mg. of pale yellow oil. This material was chromatographed on a column of silica gel according to the method of Oleinick and Corcoran *Jour. Biol. Chem.* 244:727(1969). The composition of each fraction was determined by thin layer chromatography. Fractions containing only the unknown material were pooled and concentrated in vacuo to give 98.7 mg. of white solid. Phosphate salts were removed from the preparation by passage through a column of Sephadex LH-20 prepared in methanol. The salt free solids were concentrated in vacuo to give a colorless oil. Crystallization from ether-hexane gave 33 mg. of colorless prisms softening at 160°, and melting at 165°.

As the following experimental results illustrate, erythromycin E has a spectrum of activity similar in character to erythromycin A. In the table there is shown the activity of erythromycin E against a number of bacterial strains and certain other microorganisms.

In addition to erythromycin A, as disclosed in the above example, erythromycin B and C can also be used as starting material in the described fermentation with good results.

TABLE

| Micro-organism | Minimum Inhibitor Concentration in mcg/ml at pH 7.4 |
|---|---|
| Staph. aureus 9144 | 1.56 |
| Staph. aureus Smith | 1.56 |
| Staph. aureus Smith ER | >100 |
| Staph. aureus Quinones | 25 |
| Staph. aureus Wise 155 | >100 |
| Strep. faecalis 10541 | 0.39 |
| E. coli Juhl | >100(1000) |
| Klebsiella pneumoniae 10031 | 6.2 |
| Proteus vulgaris Abbott JJ | >100(>1000) |
| Proteus mirabilis Finland 9 | >100(1000) |
| Salmonella typhimurium ED9 | >100(1000) |
| Shigella sonnei 9290 | 100 |
| Pseudomonas aeruginosa BMH10 | >100(1000) |
| Strep. pyogenes Roper | >100 |
| Strep. pyogenes Scott | >100 |
| Myco. gallisepticum S6 | 25 |
| Myco. granularum 19168 | 0.05 |
| Myco. hyorhinis 17981 | 50 |
| Myco. pneumoniae FH | 0.01 |
| Pan. redivivus Cidal | >100 |
| Trichomonas vaginalis CIMI | >100 |
| Crithidia fasciculata | >100 |
| Haemophilus influenzae 9334 | 2.5 |

Pharmaceutically acceptable non-toxic salts include single entities and mixtures of these acid addition salts which include the hydrochloride, the hydrobromide, the hydroiodide, lactobionate, thiocyanate, both lower alkyl sulfates and the higher alkyl sulfates, such as stearyl sulfate, lauryl sulfate, and cetyl sulfate, alkyl and aryl sulfonates, phosphates, sulfates, maleates, fumarates, succinates, tartrates, citrates, stearates, and others commonly used in the art.

Salts obtained through variation of the acid used to neutralize the base compound and form the acid addition salt have special advantages in some instances because of their increased stability, increased solubility, decreased solubility, ease of crystallization, or lack of objectionable taste. Such advantages accrue because of the ease of administration and assimilation of the particular acid addition salt and such properties are subsidiary to the main physiological action of the individual cation which is independent of the character of the anion of the acid used in the preparation of the salt. The process of obtaining the salt is a straight-forward neutralization reaction and can be carried out in any suitable solvent through the addition of a chemical equivalent of the base.

The compound of this invention may be administered orally or parenterally in conventional dosage forms such as tablets, capsules, injectables and the like, which incorporate erythromycin E alone, and with other pharmacodynamically active substances or with suitable carriers according to accepted pharmaceutical practices. To obtain antibiotic responses against susceptible organisms, the desired dosage range is from about 100 to 200 mg/kg of body weight.

I claim:

1. A process for preparing erythromycin E comprising culturing streptomyces erythreus NRRL 3887 in a nutrient medium comprising a carbohydrate source, a nitrogen source and added erthromycin selected from the group consisting of erthromycin A, B, and C.

* * * * *